B. W. GERHART.
TREE SPRAY.
APPLICATION FILED JAN. 12, 1920.
1,398,505.
Patented Nov. 29, 1921.
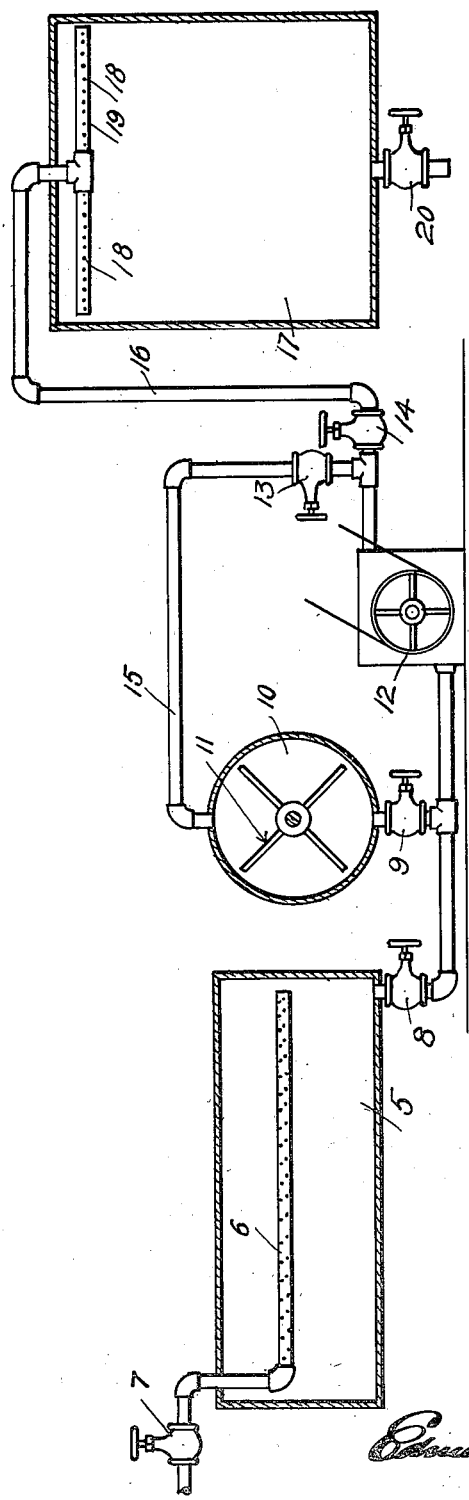
INVENTOR
Bayless W. Gerhart
ATTORNEY

UNITED STATES PATENT OFFICE.

BAYLESS W. GERHART, OF SAN BERNARDINO, CALIFORNIA, ASSIGNOR TO UNITED STATES SPRAY COMPANY, OF SAN BERNARDINO, CALIFORNIA, A CORPORATION OF CALIFORNIA.

TREE-SPRAY.

1,398,505.     Specification of Letters Patent.     Patented Nov. 29, 1921.

Application filed January 12, 1920. Serial No. 351,077.

*To all whom it may concern:*

Be it known that I, BAYLESS W. GERHART, a citizen of the United States, residing at San Bernardino, in the county of San Bernardino, State of California, have invented new and useful Improvements in Tree-Sprays.

My invention has relation more specifically to a liquid spray for spraying deciduous and citrus trees, together with various forms of plant life, to eradicate fungus and germicidal diseases common thereto.

It is an object of my invention to provide a combination of chemicals in the form of a liquid spray that are of comparatively low cost, readily procurable, and that when applied to trees affected with fungus growths, germs, and destructive insect life, will effectively exterminate the same, thus promoting a healthy growth and greatly increasing the yield of fruit.

A further object of my invention is to provide a chemical spray that will act as a perfect germicide, insecticide, and fungicide.

A still further and important object of my invention is to provide a liquid tree spray that when applied to various forms of plant life will not injure the plants, or the fruits produced by them.

Various forms of plant life are often affected by a large number of germicidal diseases, fungus growths, and destructive insect life, which not only retard the growth and the development of trees and plants, but also affect in a marked degree the quality of fruit produced thereby. Citrus fruit trees, such as the orange, lemon, and grapefruit, are often affected by various forms of "scale," and also by various forms of fungus growths.

Deciduous trees are also largely affected by fungus growths, "curley leaf," "twig borer," codling moth, blight, dry rot, and similar affections, also destructive insect life, and germ diseases. Orchardists in combating the above mentioned diseases and destructive insect life have employed an insecticide, and after an application of the same have been compelled to use a germicide to obtain the desired results, some of the chemical compounds in the form of sprays, commonly used, both injuring the foliage and the fruit produced thereon as well.

By the employment of my improved spray, which acts as an insecticide, fungicide, and germicide, only a single application is necessary to effect the desired results without injury to the trees or the fruits borne thereby.

In preparing my improved liquid tree spray, I preferably employ an apparatus consisting of tanks, agitators, pumps, and piping, which is diagrammatically illustrated in the drawing forming a part of this specification.

In order to prepare 350 gallons of my improved spray, I first place in tank 5 approximately 150 pounds of commercial fish oil soap, and 250 gallons of water. Steam is then admitted to tank 5, under a pressure of approximately 60 pounds per square inch through the medium of a perforated pipe 6, which extends the entire length of the tank, the steam being controlled by a valve 7 of any well known type. The mass is then boiled or heated to approximately 220° Fahrenheit, and held at that temperature from four to six hours. After the mixture in tank 5 has been properly heated, as heretofore set forth, it is then allowed to cool until the temperature has receded to approximately 60° Fahrenheit. Valve 8 leading from tank 5 is then opened, as well as valve 13 leading to an agitating tank 10, and the cooled liquid is then forced from tank 5 by means of a force pump 12 of any preferred construction to the agitating tank, valves 9 and 14 being closed, so that the liquid will not pass through the agitating tank. After the mixture from tank 5 has been forced into the agitating tank, valves 8 and 13 are closed and approximately 100 gallons of crude carbolic acid emulsion with a phenol co-efficient 4+ is added to the contents of the agitating tank, and the whole is then rapidly agitated by agitator 11 for approximately two hours. After the agitation has been completed in tank 10, approximately 94 pounds of sodium fluorid (NaF) is added and the agitation is continued for approximately two hours more, or until the chemicals have become thoroughly mixed.

I have found that when the sodium fluorid is added that a chemical reaction at once takes place, which when analyzed shows no characteristics of sodium fluorid.

The agitation of the mixture in tank 10 is then continued for approximately five hours more, the mixture then being forced by means of a pump 12 through the pipe line 16 into the distributing tank 17 through a series of minute apertures 18 formed in the distributing nozzles 19, under a pressure of not less than 250 pounds per square inch, the valves 8 and 13 being closed while valves 9 and 14 are opened during the mixing operation.

The resultant mixture is then ready for use, it being highly emulsified by the pressure with which it is forced into the distributing tank 16.

As heretofore stated, the addition of the sodium fluorid (NaF) to the warm emulsified oils causes a definite chemical reaction to take place between the various constituents, and produces a new chemical combination that has been employed with highly beneficial results in the eradication of destructive insect life, germicidal diseases and fungus growths common to plant life.

Instead of employing crude carbolic acid emulsified, I may substitute sheep dip, creosote, or similar ingredients having the same co-efficient as the phenol with equally efficient results.

In coating the limbs, foliage, and buds on deciduous fruit trees, the best results are obtained by the use of an approved spraying machine delivering the spray at a pressure of at least two hundred (200) pounds, so that the spray will enter the interstices formed in the bark of the trees and thoroughly saturate the same. Usually a single application is all that is necessary to control the various diseases and insect life.

What I claim is:

1. A composition of matter comprising a major proportion of water, and a minor proportion of an oily saponaceous matter, crude carbolic acid emulsified, and sodium fluorid in substantially the proportions as specified.

2. A composition of matter comprising a major proportion of water and a minor proportion of fish oil soap, crude carbolic acid, and sodium fluorid in substantially the proportions as specified.

3. The composition of matter comprising water 250 gallons, commercial fish oil soap 150 pounds, 100 gallons of crude carbolic acid emulsion having a phenol co-efficient of 4+, and 94 pounds of sodium fluorid.

In witness that I claim the foregoing I have hereunto subscribed my name this 20th day of November, 1919.

BAYLESS W. GERHART.